May 14, 1957
H. J. BELLARDI
2,792,155
SELECTIVE QUANTITY METERING DISPENSER
FOR GRANULAR MATERIAL
Filed Oct. 10, 1955
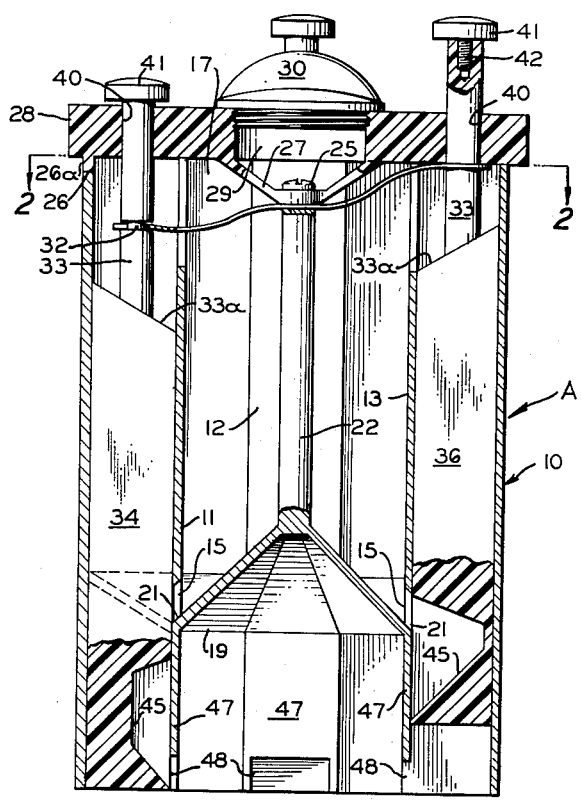
FIG_1
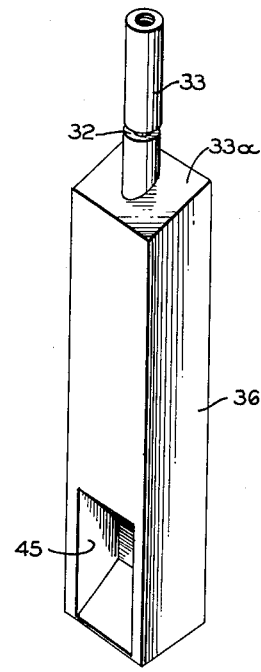
FIG_3
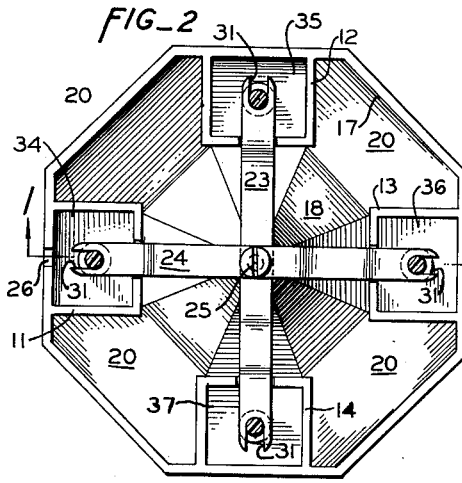
FIG_2
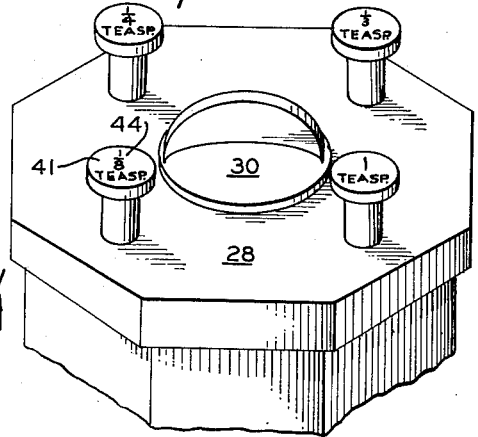
FIG_4
INVENTOR.
HUGO J. BELLARDI
BY Hansen and Lane
ATTORNEYS

United States Patent Office 2,792,155
Patented May 14, 1957

2,792,155

SELECTIVE QUANTITY METERING DISPENSER FOR GRANULAR MATERIAL

Hugo J. Bellardi, San Jose, Calif.

Application October 10, 1955, Serial No. 539,429

7 Claims. (Cl. 222—266)

The present invention relates to dispensers and pertains more particularly to a dispenser for selectively dispensing different metered quantities for fluent granular materials such as salt and sugar.

In cooking, whether in the home or in a restaurant, it frequently is necessary to measure out quantities of granular material such as salt or sugar into the ingredients being prepared for cooking. The recipes frequently call for varying small quantities of the material, such as "⅛ teaspoon of salt," "one or more teaspoonfuls of sugar," and the like.

The present invention contemplates the provision of a multiple-quantity metering device for granular material such as salt and sugar.

The invention also provides a simple easily cleaned dispenser for metering selected quantities of granular material, which dispenser is simple to manufacture, is compact, and may be readily filled, used and cleaned.

Another object of the invention is to provide a simple and improved multi-quantity metering dispenser for granular material.

These and other objects and advantages of the invention will be apparent from the following description and the accompanying drawings, wherein Fig. 1 is a vertical, medial, sectional view through a metering dispenser embodying the invention taken along line 1—1 of Fig. 2.

Fig. 2 is a sectional view of the dispenser taken along line 2—2 of Fig. 1.

Fig. 3 is a perspective view of one of the metering plungers as it appears when removed from the container.

Fig. 4 is a fragmentary, perspective view of the upper portion of the device shown in Figs. 1 and 2.

Referring to the drawings in detail, an integrally molded container unit A comprises an outer shell portion 10 of octagonal, cross sectional shape which preferably is molded of strong, shock resistant plastic material. Since many plastic materials suitable for this purpose are well known to those skilled in the art of plastics moulding they will not be enumerated herein. A plurality, in the present instance four, plunger housings 11, 12, 13, and 14 are formed inwardly of alternate inner wall faces of the outer shell 10. All of the plunger housings preferably are of similar inner cross-sectional size and shape.

An opening 15 is provided at a low point in the inner wall of each plunger housing for allowing granular material to flow by gravity from the storage compartment 17 provided by the octagonal outer shell 10 exteriorly of the plunger housings, into the plunger housings. These openings 15 all are located at the same height from the lower end of the outer shell 10.

A pyramidal bottom shield 18, which may be formed integrally with the outer shell 10 and the plunger housings 11, 12, 13 and 14 has its base plane 19 (Fig. 1) coincident with the lower edges of the openings 15 in the plunger housings. From the lower outer edges of the sides of the pyramidal shield 18 which do not intersect the plunger housings, bottom plate portions 20 are formed to slope upwardly and outwardly toward the walls of the outer shell 10. The pyramidal shield 18 and these oppositely sloping outer plate portions 20 thus provide a sealed bottom closure for the storage compartment 17. The oppositely sloping top surfaces of the pyramidal shield 18 and of the outer bottom plate portions 20 cause the granular material in the storage compartment 17 to gravitate to the level of the lower edges 21 of the openings 15.

A cover-anchoring and spring-support rod 22 is formed integrally with the apex of the pyramidal bottom shield 18, and extends upwardly therefrom coaxially of the storage chamber 17.

A pair of plunger biasing spring strips 23 and 24 (Figs. 1 and 2) are crossed centrally thereof at the upper end of the vertical center rod 22, and are secured thereto by a screw 25 which passes through central openings provided therefor in the spring strips 23 and 24 and also through a central opening in a bridge 27 formed integrally with a cover member 28 for the outer shell 10. The bridge 27 is offset downwardly toward its center as best shown in Fig. 1, to provide clearance on both sides thereof for filling the storage compartment 17 through a central threaded filler opening 29 in the cover. A detent 26 is formed at a desired point in the upper edge of the outer shell 10, and a cover locating bead 26a is provided on the under side of the cover to fit therein to locate the cover in a desired position on the shell.

The filler opening 29 is closed by a threaded cap 30 which screws into the threaded filler opening 29.

The outer ends of the spring strips 23 and 24 are bifurcated as at 31 (Figs. 1 and 2) and each fits into a groove 32 provided therefor in a rod-like extension 33 provided coaxially of the upper end of each of four metering plungers 34, 35, 36 and 37 fitted for slidable movement in the plunger housings 11, 12, 13 and 14, respectively. It will be noted in Figs. 1 and 2 that the top surfaces of the plungers are sloped toward the center of the device so that any of the granular material entering the plunger housings above the plungers therein will tend to gravitate back into the storage compartment through notches 36 in which the spring strips 23 and 24 ride upon vertical movement of their plungers.

The plunger rods 33 are slidably inserted through holes 40 provided therefor in the cover 28. A removable, buttonhead cap 41, having a threaded shank portion 42 thereon is threadedly mounted co-axially on the upper end of each plunger rod 31. Imprinted on each cap 41 is indicia 44 (Fig. 4) designating the quantity of granular material which will be discharged upon pressing the cap down to its fully depressed condition as shown at the left of Fig. 1.

Each metering plunger has a metering cavity 45 formed in its inner face near its lower end. In the upward limit of movement of the plunger, where it is normally held by the bias of its spring strip 23 or 24 as shown at the right of Fig. 1, the upper edge of the metering cavity 45 registers with the upper edge of the opening 15 of the plunger housing in which the plunger is mounted.

The granular, fluent material in the storage compartment 17 therefore flows by gravity into the plunger cavities when their respective plungers are in their normal, upward limit of movement as shown at the right of Fig. 1 to completely fill these cavities. In the upwardly biased condition of the plungers, the lower ends of the metering cavities therein are closed by plunger housing wall portions 47 (Fig. 1) below the openings 15 as shown in Fig. 1. Wall portions 47 are of the same height as the metering cavities 45 in the plungers, so as to insure that no material will be bypassed through the cavity by opening its lower end before its upper end is cut off from the supply in the storage compartment 17.

When a plunger is depressed to the position shown at the left of Fig. 1, the inner face 42 of the plunger above the cavity therein seals off the opening 15 into the storage compartment 17, and the metering cavity 45 is exposed below the lower edge of the wall portion 47, thereby freeing the metered quantity of material in the cavity for gravity discharge therefrom through a discharge opening 48 provided in the lower end of each plunger housing.

The required difference in size of the plunger cavities 45 may be attained by reducing a transverse dimension of the smaller metering cavities, since it is desirable that all of these cavities be of the same height. In Fig. 1 it will be noted that the cavity 40a in the left hand plunger is shallower than the cavity 40b in the right hand plunger.

Operation of the device is as follows:

Assume that the dispenser A is assembled as shown in Fig. 1, with the cover 28 secured in place by the screw 25 which also secures the two spring strips 23 and 24 onto the upper end of the central anchor rod 22, and the bifurcated outer ends 31 of the spring strips inserted in the grooves 32 in the rod extensions 33 on the metering plungers to normally bias the plungers toward their uppermost condition as shown at the right hand side of Fig. 1.

The central storage compartment 17 then may be filled with the desired granular material, such as salt or sugar, by unscrewing the filler cap 30 to expose the filler opening 29. After filling the central compartment 17, the filler cap 30 is replaced by screwing it into the threaded filler opening.

The granular material with which the central compartment is filled gravitates through the openings 15 in the plunger housings and fills the different sized metering cavities 45 in the four plungers. The device is then ready for use.

Upon depressing a desired one of the plunger actuating button caps 41 the plunger upon which it is mounted, for example the plunger 34, the filled metering cavity 45 therein is carried downwardly past its opening 15, thereby sealing off the plunger cavity 45 in this plunger from the storage compartment 17. Then, upon being carried downwardly to its lowermost position as shown at the lefthand side of Fig. 1, the lower end of the plunger cavity 45 clears the wall portion 47, whereupon the contents of the cavity 45 gravitate out through the bottom opening 48 and thence through the open bottom of the container. Upon releasing the button cap 41, the spring strip 23 or 24, as the case may be, returns the plunger to its uppermost condition, whereupon material from the central compartment 17 again gravitates through the opening 15 to fill the cavity and place it in condition for re-use when required.

The device comprises a simple device for containing and accurately metering selected quantities of salt, sugar or other fluent granular material by depressing a selected, marked button cap 41 associated with a plunger having the desired size of metering cavity therein.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A metering dispenser for fluent granular material comprising a tubular outer shell, a bottom wall forming, with the shell, a storage compartment, a plurality of upright plunger housings within the storage compartment, each plunger housing extending through the bottom wall and having an opening therein directly above the bottom wall communicating with a lower portion of the interior of the storage compartment for gravity flow of fluent material from the storage compartment through each of said openings into the plunger housing in which such opening is provided, a metering plunger fitted for slidable movement in each plunger compartment, means biasing each plunger to a normal upward condition in its compartment, each plunger covering said recess and extending upwardly therefrom a distance equal to the length of plunger movement in its housing, a metering recess of predetermined size in a side of each plunger, each recess being located in its plunger to register with the opening in its plunger housing in the normal upwardly biased condition of the plunger, means limiting the downward movement of each plunger, the plunger housing extending downwardly from the discharge opening therein a distance equal to the height of the plunger cavity adjacent thereto, thereby to seal off the plunger cavity when the plunger is moved initially downwardly to trap a metered quantity of material in the recess, the plunger movement being of a length to thereafter carry the cavity therein below its housing wall, whereby the trapped contents of the cavity gravitate from the cavity exteriorly of the storage compartment.

2. A metering dispenser for fluent granular material comprising a storage compartment, a plurality of upright plunger housings within the storage compartment and extending through and below the bottom thereof, each plunger housing having an opening in a side thereof communicating with a lower portion of the interior of the storage compartment for gravity flow of fluent material from the storage compartment through said openings, a metering plunger fitted for slidable movement in each plunger housing, means biasing each plunger to a normal upward condition in its compartment, a metering recess of predetermined size in the inner face of each plunger, each recess registering with the opening in its plunger housing in the normal upwardly biased condition of the plunger, each plunger housing extending below the side opening therein a distance equal to the height of the recess in its associated plunger, thereby to trap a metered quantity of material in such recess, means limiting the downward movement of each plunger, each plunger being movable downwardly a distance sufficient to carry the cavity therein below a wall of the plunger housing, whereby the metered contents of the cavity are released to gravitate therefrom exteriorly of the storage compartment.

3. A metering dispenser for fluent granular material comprising a cup-shaped compartment, a center rod secured to the bottom of the compartment and extending upwardly centrally of the compartment, a cover closing off the upper end of the compartment and secured to the upper end of the center rod, a filler cap removably closing a filler opening in the cover, a plurality of upright plunger housings within the storage compartment, each plunger housing extending through the bottom of the compartment and having an opening in a side thereof above the bottom of the compartment openly communicating with a lower portion of the interior of the compartment for gravity flow of the contents of the storage compartment through such opening, a metering plunger fitted for slidable movement in each plunger compartment, spring strips interposed between the cover and the upper end of the center rod biasing each plunger to a normal upward condition in its compartment, a metering recess of predetermined size in a face of each plunger, each recess registering with the opening in its plunger housing in the normal upwardly biased condition of the plunger, each plunger housing extending below the opening in its side a sufficient distance to seal off the recess in its associated plunger and thereby trap the metered quantity of fluent material from the compartment in such recess, and an extension on each plunger extending through a hole in the cover and movable downwardly with its plunger a distance sufficient to carry the cavity in the plunger clear of a lower edge of the plunger housing, whereby the metered contents of the cavity gravitate therefrom exteriorly of the compartment.

4. A selective, multiple quantity metering dispenser for fluent granular material comprising a tubular outer shell, a plurality of plunger housings formed lengthwise on the inner side of the outer shell, each of said housings being open at its lower end and having an opening in a side thereof spaced upwardly from the lower end of the housing, a bottom partition disposed transversely of the outer shell and sealed to the outer shell and to the plunger housings directly below said openings therein to form a compartment for fluent material, a metering plunger mounted for slidable movement in each plunger housing, means resiliently supporting the plungers in predetermined raised positions in their housings, each plunger having a metering cavity in a side thereof located in the raised condition of the plunger in register with the opening in its plunger wall to admit a metered quantity of granular material from the central compartment by gravity flow into the cavity, all of said cavities being of the same height, but being of different transverse areas to vary the volume of each of the cavities relative to the others, a wall portion on each housing below the opening therein of a height equal to the vertical height of the cavities, and a plunger actuating rod secured to each plunger and extending exteriorly of the container for manually depressing its plunger to lower the cavity in the plunger below the lower wall portion, whereby the cavity is initially sealed by the wall portion below the side opening therein to trap a metered quantity of material in such cavity, and is thereafter carried below the lower end of its plunger housing to release the contents of the cavity for gravity discharge exteriorly of the compartment.

5. A selective, multiple quantity metering dispenser for fluent granular material comprising a container consisting of an outer shell and a raised bottom, a plurality of upright plunger housings within said container, each of said housings extending through the container bottom and having an opening therein above the container bottom communicating with a lower portion of the interior of the container, a metering plunger mounted for slidable movement in each plunger housing, flat spring means secured to the container and in yoked engagement with each plunger, thereby resiliently supporting the plungers in predetermined raised positions in their housings, each plunger having a metering cavity therein located, in the raised condition of its plunger, in register with the opening in its plunger wall to admit granular material from the central compartment by gravity flow into the cavity, all of said cavities being of the same height, but being of different transverse areas to vary the volume of each of the cavities relative to the others, a wall portion on each housing below the opening therein of a height equal to the vertical height of the cavity in the plunger therein to trap a metered quantity of material in such cavity, and a plunger actuating rod operably engaging each plunger and extending exteriorly of the container for manually depressing its plunger to lower the cavity in the plunger below the lower wall portion, and below the bottom of the container, whereby the fluent granular material trapped in the cavity is released for gravity discharge externally of the container.

6. A metering dispenser for fluent granular material comprising a tubular outer shell, a plurality of tubular plunger housings on the inner face of the outer shell, a conical bottom closure deflector closing off the container inwardly of the plunger housings, sealing members coterminal with the bottom deflector and sloping oppositely thereto and closing off the spaces between the plunger housings, each plunger housing having an opening therein directly above the bottom closure deflector, a metering plunger fitted for slidable movement in each plunger housing, a cover plate closing the top of the outer shell and having a filler opening therein, a cover anchor rod extending co-axially upwardly from the center of the conic bottom closure deflector, a pair of crossed leaf springs interposed between the cover and the top of the rod, the outer end of each spring having operative engagement with a plunger and urging the latter upwardly in its housing, and releasable fastening means securing the cover to the rod and binding the spring therebetween.

7. A metering dispenser for fluent granular material comprising a tubular outer shell, a plurality of tubular plunger housings within the outer shell, a bottom closure member spaced upwardly from the lower end of the shell, each plunger housing having one opening therein directly above the bottom closure member and having a second opening at its lower end, a metering plunger fitted for slidable movement in each plunger housing, a cover plate closing the top of the outer shell and having a filler opening therein, said cover having an opening therein aligned with each plunger housing, a cover anchor rod extending co-axially upwardly from the center of the bottom closure member, a pair of crossed leaf springs interposed between the cover and the top of the rod, the outer end of each spring having operative engagement with a plunger and urging the latter upwardly in its housing, each plunger having a metering cavity in register with the plunger housing opening in the upward position of the plunger, releasable fastening means securing the cover to the rod and binding the springs therebetween, and an extension on each plunger slidably fitted into each aligned cover opening and extending above the cover a distance sufficient to move the plunger thereon downwardly to carry the cavity therein into the second opening in the plunger housing whereby the contents of the cavity are free to gravitate therefrom.

References Cited in the file of this patent

UNITED STATES PATENTS

| | | |
|---|---|---|
| 19,824 | Bigelow | Apr. 6, 1858 |
| 576,241 | Van Ame | Feb. 2, 1897 |